United States Patent [19]

Kim

[11] Patent Number: 5,227,880
[45] Date of Patent: Jul. 13, 1993

[54] MOTION ADAPTIVE FREQUENCY FOLDING CIRCUIT

[75] Inventor: Yong-Je Kim, Suwon, Rep. of Korea

[73] Assignee: SamSung Electronics Co., Ltd., Suwon, Rep. of Korea

[21] Appl. No.: 903,272

[22] Filed: Jun. 24, 1992

[30] Foreign Application Priority Data

Jun. 27, 1991 [KR] Rep. of Korea ............. 91-10837

[51] Int. Cl.$^5$ .................. H04N 7/04; H04N 7/18; H04N 11/06
[52] U.S. Cl. .................. 358/141; 358/105; 358/12; 358/335
[58] Field of Search .................. 358/105, 12, 141, 11, 358/310, 335

[56] References Cited

U.S. PATENT DOCUMENTS

| 4,698,671 | 10/1987 | Chen et al. | 358/136 |
| 4,831,463 | 5/1989 | Faroudja | 358/310 |
| 5,083,203 | 1/1992 | Ko et al. | 358/105 |
| 5,097,330 | 3/1992 | Guichard et al. | 358/105 |
| 5,113,262 | 5/1992 | Strolle et al. | 358/310 |
| 5,161,018 | 11/1992 | Matsunaga | 358/105 |

Primary Examiner—John K. Peng
Attorney, Agent, or Firm—Robert E. Bushnell

[57] ABSTRACT

The present invention relates to a motion adaptive frequency folding circuit, and more particularly to a motion adaptive frequency folding circuit which can prevent the degradation of picture quality caused by artifact in reproduction by recording whole bands on a recording medium by way of providing different folding to the signal of limited frequency bands through the motion signal showing motion images.

7 Claims, 2 Drawing Sheets

MOTION ADAPTIVE FREQUENCY FOLDING CIRCUIT

BACKGROUND OF THE INVENTION

1. Field of the Invention

The present invention relates to a motion adaptive frequency folding circuit, and more particularly to a motion adaptive frequency folding circuit, which can improve resolution during reproduction by folding signal components having more than certain frequency over the signal components having less than certain frequency in accordance with the magnitudes of motion signals, using limited frequency bandwidth and being added to image signal treatment apparatus processing the information above the given bandwidth.

2. Description of the Prior Art

In the conventional VHS-Type VTR, due to the Video tape characteristics, it was impossible to tele-record the high frequency exceeding 2.5 MHZ. Accordingly, the viewer has to view considerably low resolution of pictorial images as compared with TV, S-VHS(Super-VHS) or the like because the frequency in the conventional VHS-type VTR can cover only approx. 60% of TV signal bandwidth.

In the case of S-VHS, though fine pictures can be provided by transmitting bandwidths exceeding those of TV signals, there has been a problem of not being able to be compatible with the conventional VHS VTR.

In other words, S-VHS system has problems of conspicuously-reduced resolution and incompatability when the signals recorded under the standard VHS-type VCR are tele-recorded.

Furthermore, S-VHS system has required fine quality of vides tapes and fine quality of recording/tele recording apparatuses.

Meanwhile, in U.S. Pat. No. 5,113,262 by Korea's Samsung Electronics Company, Ltd., an improved image record reproducing apparatus was introduced which can record o the standard quality of recording medium much broader bandwidths of image signals than the image signals recorded by the said standard VHS-type VCR, and which can maintain compatibility with the standard VHS type VCR, the incompatibility of which was the drawback of said S-VHS type VCR.

According to said American laid open U.S. Pat. No. 5,113,262, the motion signal showing the transfer of the images are properly extracted, are modulated in the chromaticity signal and are recorded.

The motion signal is used for controlling the transition of luminance signal domain covering whole bandwidths stretching out to orignal frequency bands during reproducing and fold the high frequency component out of the luminance signals to the low frequency component during recording.

However, in this kind of technical construction, motion signals can not be detected accurately during reproducing, and the artifact like the dot crawl patterns generated by the co-existence of folding carrier waves is produced, causing the picture quality to be degraded.

SUMMARY OF THE INVENTION

Accordingly, it is the object of the present invention to provide a motion adaptive frequency folding circuit which can prevent the picture quality from decreasing caused by the artifact during reproducing by recording on the recording medium the whole bands by way of making the folding in the signals of limited frequency bands different through motion signals representing motion images.

The motion adaptive frequency folding circuit as provided in accordance with the present invention for achieving the said objects comprises as follows:

the first signal separation means for separating temporal high frequency components and temporal low, frequency components from composite image signals;

the second signal separation means for separating into horizontal low frequency components and horizontal high frequency components the temporal low frequency components separated by said first signal separation means;

gain control means for controlling the gains of horizonal high frequency components separated by said second signal separation means;

modulation means for moving the horizontal high frequency components gain-controlled at said gain control means to the horizontal low frequency bands of temporal high frequency;

the tertiary signal separation means for separating the temporal high frequency components separated from said first signal separation means into horizontal low frequency components and horizontal high frequency components;

motion signal detecting means for detecting motion signals from horizontal low frequency components separated from the tertiary signal separation means;

soft switching means for controlling the output of horizontal low frequency components separated from horizontal low frequency components and tertiary signal separation means band-moved from said modulation means in accordance with the motion signals detected from said motion signal detecting means;

additive means for adding horizontal low frequency components out of horizontal high pass components and temporal high frequency components band-moved and output-controlled from soft switching means; and horizontal low frequency component filtering means for outputting only horizontal low frequency components of the signals added from said additive means.

Other aspects and advantages of the present invention will become apparent from the following description of the accompanying drawings, which disclose, by way of example, the principles of the invention.

DETAILED DESCRIPTION OF THE INVENTION

Figure 1:
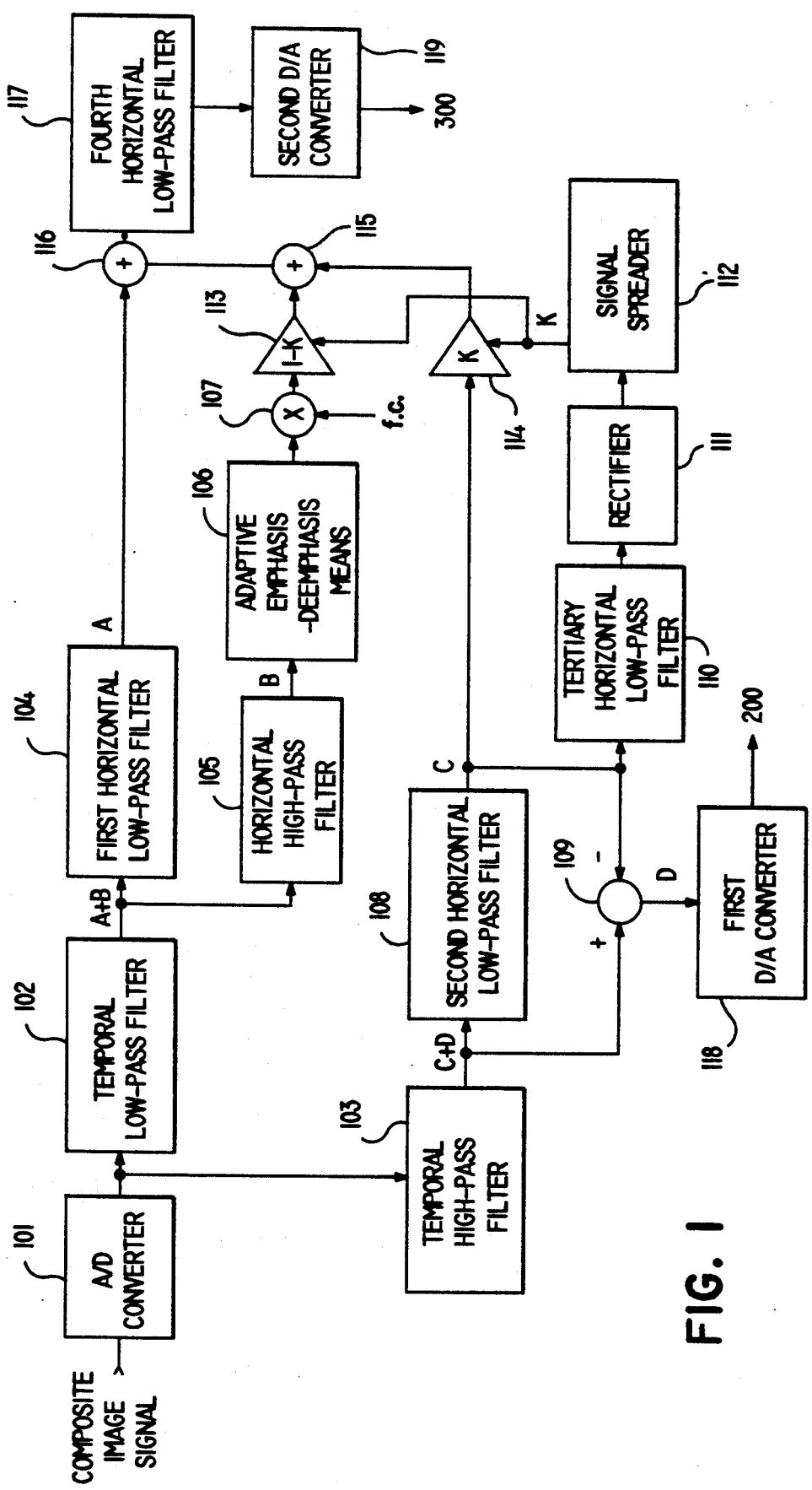
FIG. 1 is a block diagram of another embodiment of the present invention for a motion adaptive frequency folding circuit.

FIG. 1 is a block diagram of an embodiment of the present invention for a motion adaptive frequency folding circuit wherein 102 & 103 are temporal low pass filter (LPF) and temporal high-pass filter which are the first signal separation for means separating respectively temporal low frequency components and temporal high frequency components from the composite image signal changed into digital composite image signal from anolog/digital converter 101;

104 & 105 are the first horizontal low-pass filter and horizontal high-pass filter which are the second signal separation means for separating temporal low frequency components separated by said first separation means into horizonal low frequency components separated by said first separation means into horizonal low frequency components and horizontal high frequency components;

106 is an adaptive emphasis/de-emphasis part which is a gain control means for controlling horizontal high frequency components separated by the second signal separation means;

107 is an adaptive folding part which is a modulation means for moving horizontal high frequency component out of the temporal low frequency components gain-controlled by said gain control means to horizontal low frequency band of temporal high frequency;

108 & 109 the are second horizontal low-pass filter and the first adder which are the tertiary signal separation means for separating the temporal high frequency components separated by said first signal separation means into horizontal low frequency components and horizontal high frequency components;

110, 111 and 112 are a tertiary horizontal low-pass filter, a rectifier and a signal spreader which are motion signal detecting means for detecting motion signals from the horizontal low frequency component separated from the tertiary signal separation means;

113 is the first soft switch which is a soft switching means for limiting the output of horizontal high frequency component out of temporal low frequency components moved from said modulation means to horizontal low frequency band pass of temporal high frequency according to the motion signals detected from the said motion signal detecting means;

114 is the second soft switch which is the soft switching means for limiting the output of horizontal low frequency component out of the temporal high frequency components separated from the tertiary signal separation means in accordance with the motion signals detected from the said motion signal detecting means;

115 is the second adder which is the adding mean for adding horizontal low frequency component out of temporal low frequency components moved to horizontal low frequency bands iofhorizontal low frequency components and temporal high frequency out of temporal high frequency components limited in output from soft switching means;

116 is the tertiary adder which is the adding means for adding horizontal low frequency component out of temporal low frequency components separated from said first signal separation means and horizontal high frequency component;

117 is the fourth horizontal low-pass filter which is the horizontal low frequency component filtering means for outputting only the horizontal low frequency signal component of the signals added from said additive means;

118 is the first digital/analog converter for converting color components deprived of horizontal low frequency components from temporal high frequency components separated from said tertiary signal separation means into analog signals;

119 is the second digital/analog converter for converting horizontal low frequency components filtered from said fourth horizontal low-pass filter into analog signals.

Figure 2:
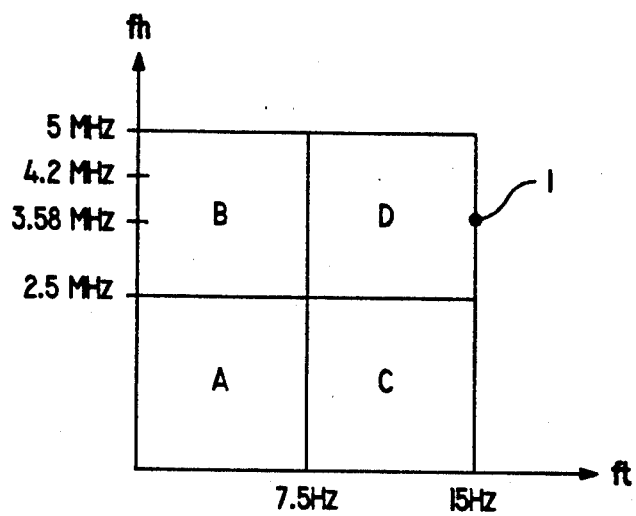
FIG. 2 is a band drawing of NTSC image signal.

FIG. 2 is band drawing of NTSC image signal wherein the signals are located within time axis (ft) of 15 HZ and horizontal frequency axis (fh) of 4.2 MHZ.

The conventional VTR tape can only record horizontal low frequency components(A, C.) out of bands of said NTSC image signals and is unable to record horizontal high frequency componts(B, D.)

However, temporal high frequency component D out of the horizontal high frequency components is color and diagonal high frequency component, out of which color component is separated, low frequency-converted and recorded.

Figure 3:
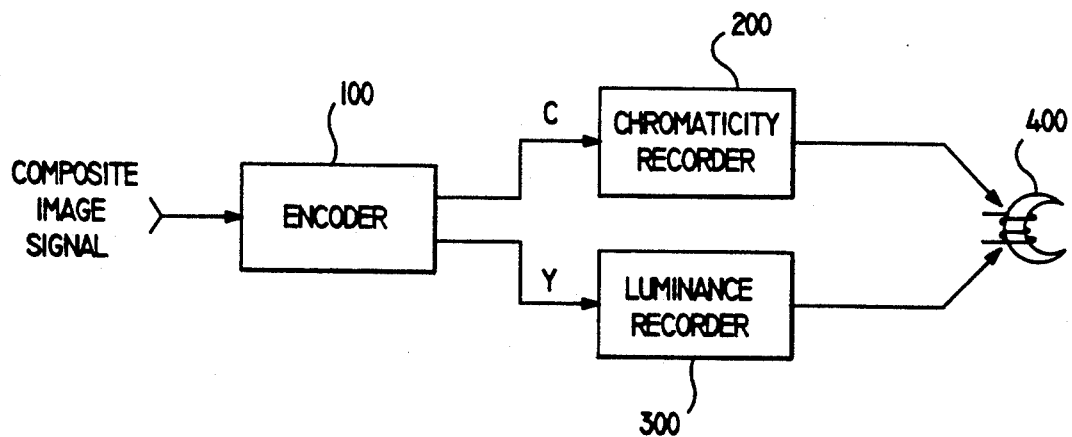
FIG. 3 is a block diagram of an embodiment of an image recording apparatus applied with the motion adaptive frequency folding circuit in accordance with the present invention.

FIG. 3 is a block diagram of an embodiment of an image recording apparatus applied with the motion adaptive frequency folding circuit in accordance with the present invention, wherein the motion adaptive frequency folding circuit 100 in accordance with the present invention treats the composite image signal, outputs color signal C and luminance signal Y, and then color signal C and luminance signal Y are recorded on the tape by a head 400 through chromaticity recorder 200 and luminance recorder 300 respectively.

Hereunder, detailed explanation regarding the motion adaptive frequency folding circuit in accordance with the present invention is given with reference to the attached drawings.

FIG. 1, analog/digital converter 101 convets composite image signal into digital composite image signal.

At this point, approx. 10 MHZ is chosen as samgling frequency in the signal of NTSC method.

The digital composite image signal converted at analog/digital converter 101 is inputted into temporal low-pass filter 102 and temporal high-pass filter 103.

The temporal low frequency luminance components A,B in FIG. 2 which are unchanged time-wise are filtered at said temporal low-pass filter 102 for the outputting.

At the first horizontal low-pass filter 104, the horizontal low frequency luminace component A out of the outputs A, B of said temporal low-pass filter 102 is outputted and at horizontal high pass filter 105, the horizontal high frequency luminance component B out of outputs A, B of said temporal low-pass filter 102 is outputted.

At this moment, the horizontal high frequency luminance component B is the horizontal high frequency component among the temporal low frequency components to be transmitted and folded to horizontal low frequency band(C domain) of temporal high frequency by using the frequency folding.

Meanwhile, if the amplitude possessed by the horizontal high frequency luminance component B out of temporal low frequency components is folded over the horizontal low frequency band (C domain) of temporal high frequency as it is, artifacts of dot crawl pattern appear in case reproduction is made in the conventional VCR due to folded horizontal high frequency luminance componets B, which causes a drawback of not maintaining the compatibility.

Furthermore, when the amplitude of horizontal high frequency luminance component B is reduced on a uniform base, and as small signals decrease in the same manner as the noise levels, there arises a tendency of causing a drawback of being amplified with noises if amplified to the original signal during reproduction.

Accordingly, at the adaptive emphasis/de-emphais part 106, if the amplitude of horizontal high frequency luminance component B out of temporal low frequency components to be folded to horizontal low frequency band(C domain) of temporal band is small, the amplitude should be enlarged, and if the amplitude of horizontal high frequency luminance component B to be folded is large, the amplitude is reduced for outputting to the adative folding part 107.

At this point, the adaptive emphasis/de-emphasis part 106 can be omitted unless compatibility is needed.

At the adaptive folding part 107, the signal outputted from said adaptive emphasis/de-emphasis part 106 is modulated by folding carrier waves f, c.

In this location, the folding carrier wave f, c is aligned to be located at ½ of maximum vertical frequency, the temporal frequency at 15 HZ, and at approx. 5 MHZ in horizontal direction.

At the adaptive folding part 107, the temporal low frequency component out of horizontal high frequency luminance components B outputted from said adaptive emphasis/de-emphasis part 106 is field-offset-subsampled by said modulation frequency and is moved to horizontal low frequency band domain of temporal high frequency.

In this location, the folding carrier wave f, c is aligned to be located at ½ of maximum vertical frequency, the temporal frequency at 15 HZ and at approx. 5 MHZ in horizontal direction.

At this moment, the output signal of adaptive folding part 107, in other words, the signal sampled and off-setted per field unit, is located around Fukinuki hole and if seen from 3-dimentional space, is located away from the luminance signal of basic domain.

In the meantime, at the temporal high frequency pass filter 103, the temporal high frequency component C, D out of digital composite image signals of analog/digital converter 101 is filtered and outputted.

At the second horizonal low frequency pass fiter 108, horizontal low fequency luminance component C out of signals for temporal high frequency components outputted from said temporal high-pass filter 103 is outputted. The temporal high frequency components C, D outputted from temporal high-pass filter 103 and the signal of the horizontal low frequency luminance component C out of temporal high frequency components outputted from said second horizontal low-pass filter 108 are inputted into the first additive means 109.

At the first additive means 109, by subtracting the output signal (C domain) of the second horizontal low-pass filter 108 from the output signals (C,D domains) of said temporal high-pass filter 103, the signals (D domain) of horizontal high frequency components out of temporal high frequency components including chrominance signal and diagonal high frequency of luminance compoents are outputted.

At the first digital/analog converter 118, the output of said first additive 109 is converted into analog form and outputted to chromaticity recorder illustrated in FIG. 3

At the tertiary horizontal low-pass filter 110, the signal (C domain) of horizontal low frequency component out of temporal high frequency components outputted from said second horizontal low-pass filter 108 is filtered so that signals within cut-off frequency of 1.75–2.0 MHZ can only be outputted.

The reason low-pass filter having low cut-off frequency is used is to prevent the motion-informed componets through subsampling from being included because motion signals are detected eve though pixel changes between frames by virtue of subsampling are not the actual operating magnitude.

Meanwhile, at the rectifier 111, the negative value of motion signal outputted from the tertiary horizontal low-pass filter 110 is changed to positive value.

At the signal spreader 112, the signals outputted from said rectifier 111 is spread horizontally, vertically and time-wise. This is to prevent artifacts by giving slow changes through spreading and levelling of this motion signals because artifacts like blurrings occur at around the boundary if the soft switches 113, 114 are switched at the point where the motion is changed abruptly.

In the meantime, the detailed construction and operational description for the signal spreader 112 are explained on the Korean laid open patent application No. 07/531057 dated on May, 31, 1990 by Mr. Koh Jung Hwan, et al. entitled "control signal spreader".

The acceptance value K of the motion signal outputted from the signal spreader 112 controls the first & second soft switches 113, 114 and adjusts the amount of folding high frequency component.

The acceptance value K of the motion signal becomes "0" in case of moitonless still status and controls the first & second soft switches 113, 114, and thereafter the signals outputted from the first soft switch 113 are inputted to the second additive means 115.

In other words, the luminance signals of horizontal high frequency component B out of temporal low frequency components folded to horizontal low frequency band(C domain) of temporal high frequency are inputted to the second additive means 115.

At the tertiary additive means 116, the luminance signals of horizontal low frequency component out of temporal low frequency components outputted from the first horizontal low-pass filter 104 and the output signals of the second additive means 115 are combined.

The fourth horizontal low-pass filter 117 band-controls the output signals of the tertiary additive means 116 in proportion to the band of recording medium.

In the case of quasi-motion picture, the motion signal acceptance value K outputted from signal spreader 112 becomes "0.5", and the outputs from the first & second soft switches 113, 114 are added to the second additive means 115 which are combined with the luminance signal A of horizontal components at the tertiary additive means 116 for being inputted to the fourth horizontal low-pass filter 117.

In the case of full-motion picture, the motion signal acceptance vale K outputted from signal spreader 112 becomes "1", limiting the output of the first soft switch 113, and the signal (C domain) of horizontal low frequency component out of temporal high frequency components outputted from the second soft switch 114 is inputted into the second additive means 115 for combination with the luminance signal A of horizontal low frequency component out of temporal low frequency components at the tertiary additive means 116, and then inputted into the fourth horizontal low-pass filter 117.

In the signal outputted from said tertiary additive means 116, the high frequency component of more than 2.5 MHZ is folded under 2.5 MHZ and the component of less than 2.5 MHZ is in a degree folded with the frequency of more than 2.5 MHZ.

In the horizontal low-pass filter 111, as the frequency is limited from 2.5 MHZ to 3 MHZ for the conventional VHS VTR, the signal of more than 2.5 MHZ is eliminated to meet the band of the conventional VHS system.

In the digital/analog converter 112, the folded luminance signal outputted from said horizontal low-pass filter 111 is converted into analog signal.

Said luminance signal Y which has been converted into analog signal is recorded onto the recording medium through the luminance recorder 300 and the head 400 of FIG. 3.

Said luminance signal Y has the same attenuated bandwidth as the standard luminance signal produced by the currently-used VCR.

Said luminance signal, whereas the high frequency component of attenuated amplitude is folded, includes the signal component of whole bands of NTSC type within reduced bandwidths.

The luminance recorder 300, in just the same method as the luminance signal of said bandwidth is recorded on the standard VCR, records the luminance signals including low frequency component having high frequency component.

In other words, in the case of standard VHS-type VCR for recording TV signal of limited bandwidths, the low frequency luminance component(A domain) changeless on the time axis and the low frequency luminance component changeable on the time axis (C domain) are recorded on recording medium.

From the foregoing description, the motion adaptive frequency folding circuit in accordance with the present invention can control gains according to the magnitudes of high frequency component of luminance signal, performs the field offset subnyquist sampling on the gain-controlled signals, and can provide improved high fidelity of image signals during reproduction by recording on the recording medium the whole bands within the limited bands by way of folding on the low frequency components.

Furthermore, the present invention can provide improved good quality of image signals, still keeping the compatibility with the existing VCR, in accordance with the luminance signals, by controlling the magnitudes of high frequency component to be folded on the low frequency component and by recording on the recording medium the whole bands within limited bands by way of folding on the low frequency component the high frequency component of the luminance signal.

As mentioned above, the present invention has, as being applied to band limit appliances, the advantage of enabling to transmit the signals having wide ranges of frequencies within the limited bands by folding the signals having the frequencies exceeding the limited bands within the limited bands in accordance with the magnitudes of the motion signals.

As described in the preferred embodiment of the present invention, various modifications can be made, without departing from the spirit and the scope of the invention. Accordingly, it is not intended that the invention be limited except as by the appended claims.

What is claimed is:

1. A motion adaptive frequency folding circuit comprising:
   the first signal separation means for separating temporal high frequency component and temporal low frequency component from the composite image signals;
   the second signal separation means for separating into horizontal low frequency component and horizontal high frequency component the temporal low frequency components separated by said first signal separation means;
   gain control means for controlling the gains of horizontal high frequency component separated from said signal separation means;
   modulation means for moving the horizontal high frequency component out of temporal low frequency components gain-controlled at said gain control means to the horizontal low frequency bands of temporal high frequency;
   the tertiary signal separation means for separating the temporal high frequency components separated from said first signal separation means into horizontal low frequency component and horizontal high frequency component;
   motion signal detecting means for detecting the motion signal from the horizontal low frequency component out of temporal high frequency components separated from said tertiary signal separation means;
   soft switching means for controlling the horizontal high frequency component band-moved from said modulation means in accordance with the motion signal detected from said motion signal detecting means, and for controlling the output of horizontal low frequency component out of the temporal high frequency components separated from the tertiary signal separation means;
   additive means for adding horizontal high frequency component band-moved and output-limited from soft switching means and horizontal low frequency component out of temporal high frequency components, and for adding horizontal low frequency component out of temporal low frequency components separated from said first signal separation means; and
   horizontal low frequency component filtering means for outputting only the horizontal low frequency component of signals added from said additive means.

2. A motion adaptive frequency folding circuit as defined in claim 1, wherein the first signal separation means includes:
   temporal low-pass filter for detecting the temporal low luminance component from composite image signal; and
   temporal high-pass filter for detecting the temporal high luminance component from composite image signal.

3. A motion adaptive frequency folding circuit as defined in claim 1, wherein the second signal separation means includes:
   the first horizontal low-pass filter; and
   a horizontal high-pass filter for detecting horiznotal nigh frequency component out of temporal low frequency components.

4. A motion adaptive frequency folding circuit as defined in claim 1, being separated from the luminance signal of basic domain by the horizontal high frequency component out of temporal low frequency components moved to the horizontal frequency band of temporal high frequency being located near Fukinuki hole.

5. A motion adaptive frequency folding circuit as defined in claim 1, wherein the tertiary signal separation means includes:

the second horizontal low-pass filter for detecting the horizontal low frequency component out of temporal high frequency components; and the first adder for detecting horizontal high frequency component by subtracting the horizontal low frequency component from temporal high frequency component.

6. A motion adaptive frequency folding circuit as defined in claim 1, wherein soft switching means includes the first & second soft switches having mutually contradictory charateristics against the motion signal.

7. A motion adaptive frequency folding circuit as defined in claim 1, wherein the additive means includes:

the second adder for adding the horizontal high frequency component out of temporal low frequency components moved to horizontal low frequency band of temporal high frequency; and the tertiary adder for adding the output of said second adder and horizontal low frequency component out of temporal low frequency components.

* * * * *

UNITED STATES PATENT AND TRADEMARK OFFICE
CERTIFICATE OF CORRECTION

PATENT NO. : 5,227,880
DATED : July 13, 1993
INVENTOR(S) : Yong-Je KIM

It is certified that error appears in the above-indentified patent and that said Letters Patent is hereby corrected as shown below:

| | | |
|---|---|---|
| Column 1, | line 37, | after "recording/", change "tele recording" to --tele-recording--; |
| | line 42, | after "record", change " o " to --on--; |
| Column 2, | line 37, | after "horizontal", change "high pass" to --high-pass--; |
| | line 45, | before "accompanying", insert --preferred embodiment, taken in conjunction with the--; |
| Column 3, | line 44, | after "adding", change "mean" to --means--; |
| Column 6, | line 2, | before "though", change "eve" to --even--; |

UNITED STATES PATENT AND TRADEMARK OFFICE
CERTIFICATE OF CORRECTION

PATENT NO. : 5,227,880
DATED : July 13, 1993
INVENTOR(S) : Yong-Je KIM

It is certified that error appears in the above-indentified patent and that said Letters Patent is hereby corrected as shown below:

Column 7,    line 32,    after "offset", change "subnyquist" to --subnyguist--;

Column 8,    line 57,    before "frequency", change "nigh" to --high--:

Signed and Sealed this

Twenty-sixth Day of November 1996

Attest:

BRUCE LEHMAN

Attesting Officer            Commissioner of Patents and Trademarks